(12) United States Patent
Neves

(10) Patent No.: US 11,514,130 B2
(45) Date of Patent: Nov. 29, 2022

(54) SYSTEMS, METHODS, AND DEVICES FOR HYBRID IMPLEMENTATION OF NATIVE AND WEB COMPONENTS

(71) Applicant: Salesforce.com, Inc., San Francisco, CA (US)

(72) Inventor: João Henrique Pimentel Wanderley Neves, Tampa, FL (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/121,271

(22) Filed: Dec. 14, 2020

(65) Prior Publication Data

US 2022/0188374 A1    Jun. 16, 2022

(51) Int. Cl.
*G06F 16/957* (2019.01)
*G06F 16/9035* (2019.01)
*G06F 16/958* (2019.01)
*G06F 16/955* (2019.01)

(52) U.S. Cl.
CPC ...... *G06F 16/9577* (2019.01); *G06F 16/9035* (2019.01); *G06F 16/958* (2019.01); *G06F 16/9566* (2019.01)

(58) Field of Classification Search
CPC ............... G06F 16/9577; G06F 16/958; G06F 16/9035; G06F 16/9566
See application file for complete search history.

(56) References Cited

U.S. PATENT DOCUMENTS

| | | | |
|---|---|---|---|
| 10,332,289 B2 | 6/2019 | Neves | |
| 10,540,168 B2 * | 1/2020 | DiTullio | G06F 8/65 |
| 10,699,452 B2 | 6/2020 | Neves | |
| 10,956,529 B1 * | 3/2021 | Lu | G06F 16/954 |
| 2010/0211893 A1 * | 8/2010 | Fanning | G06F 8/38 715/760 |
| 2017/0212672 A1 * | 7/2017 | Bloch | G06F 16/986 |
| 2018/0203839 A1 * | 7/2018 | Myren | H04L 67/2842 |

* cited by examiner

*Primary Examiner* — Scott T Baderman
*Assistant Examiner* — Seung Woon Jung
(74) *Attorney, Agent, or Firm* — Polygon IP, LLP

(57) ABSTRACT

Systems, methods, and devices enable the display of native and web components of application. Devices are capable of identifying at least one native component and a plurality of web components that includes a first web component and a second web component, wherein the at least one native component and the plurality of web components are configured to be displayed on a user interface screen. Devices are also capable of generating an image of the first web component and an image of the second web component, displaying the at least one native component at a location on the user interface screen that is between the image of the first web component and the image of the second web component.

20 Claims, 14 Drawing Sheets

SYSTEMS, METHODS, AND DEVICES FOR HYBRID IMPLEMENTATION OF NATIVE AND WEB COMPONENTS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to software applications, and more specifically to the generation and display of web content for such software applications.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Applications may be implemented on a variety of devices, such as mobile devices. Such applications may include various components, such as user interface elements, displayed in a display device of the device. The components may be native components as well as web components. Conventional applications remain limited in their ability to generate and display such native and web components in a single user interface screen.

BRIEF DESCRIPTION OF THE DRAWINGS

The included drawings are for illustrative purposes and serve only to provide examples of possible structures and operations for the disclosed inventive systems, apparatus, methods and computer program products for the generation and display of native and web components. These drawings in no way limit any changes in form and detail that may be made by one skilled in the art without departing from the spirit and scope of the disclosed implementations.

DETAILED DESCRIPTION

Figure 1:
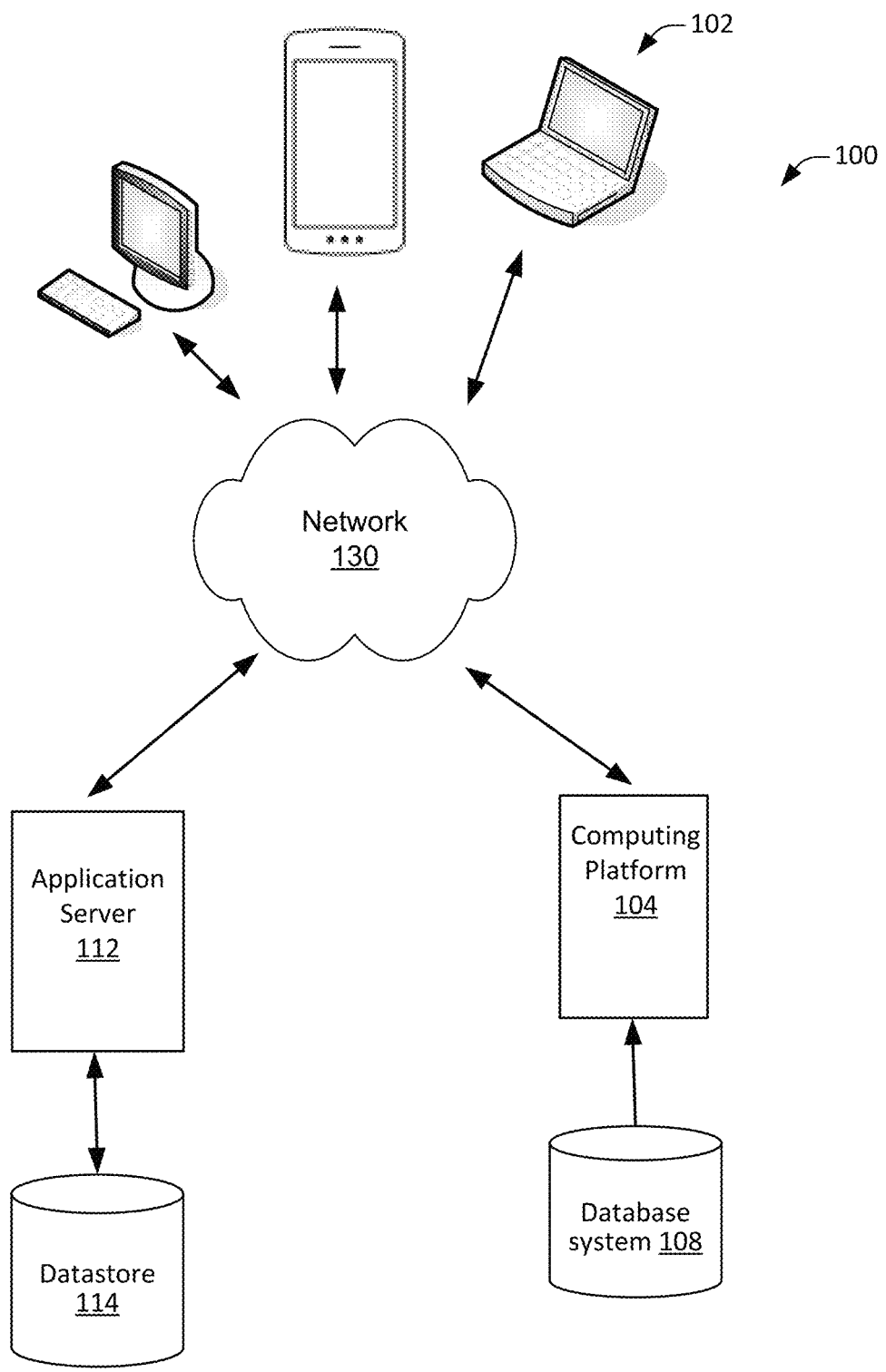
FIG. 1 illustrates an example of an arrangement of components in a distributed system, configured in accordance with one or more implementations.

Software applications may use web components, as may be implemented by a WebView browser, to display web content in an application. A WebView browser may be an embeddable browser that is configured to display such content. Accordingly, a display screen generated by the software application may include content that includes native components that contain code native to the application's execution environment, and may also include web components that contain web code used for the display of web content. In one example, a mobile device may execute a mobile application to display both native components and a web component in a user interface screen. However, such implementations of a mobile application are limited in their ability to display such components because the WebView browser is a "non-divisible" component and cannot be divided. Accordingly, conventional mobile applications are not able to freely and dynamically arrange user interface elements included in native and web components.

Various implementations disclosed herein provide the ability to generate user interface screens for applications that support the dynamic and custom configuration and rearrangement of user interface elements included in native and web components of an application. As will be discussed in greater detail below, images may be generated and used to display snapshots of the components, and the images may be arranged based on a dynamic or custom layout. In this way, the presentation of native and web components may be interleaved or removed despite the "non-divisible" nature of the WebView underlying the web components. Moreover, such configurations may be updated dynamically based on touch inputs received from users of the mobile application.

For example, a mobile device may execute a mobile application used to display various information associated with an on-demand database service, as may be provided by as Salesforce.com®. The mobile application may generate a user interface screen that include native components used to display native user interface elements, and may also include user interface elements associated with web components included in a WebView. Images may be captured for the various user interface elements, and the images may be masked and/or cropped, and arranged based on a new configuration or layout. Thus, a new configuration and layout of the user interface elements may be generated and displayed by the mobile application. More specifically, images of the web components may be interleaved with images of the native components. The images may be removed and replaced with their actual underlying component in response to receiving an input. For example, if a touch input is detected at a particular web component, the image may be removed, and the underlying WebView may be masked and positioned to enable interaction with the web content inside the WebView. In this way, images may be generated for multiple web components included in a WebView, and may be arranged in a configurable manner, thus giving the appearance of a divisible WebView browser.

FIG. 1 illustrates an example of an arrangement of components in a distributed system, configured in accordance with one or more implementations. As will be discussed in greater detail below, a system, such as system 100, may be configured to support one or more web applications and/or cloud services, which may be distributed applications. Accordingly, system 100 may be configured to provide coupling between such an application and a computing platform to enable the implementation of the application in combination with one or more other cloud services. As will be discussed in greater detail below, execution of a component, such as a mobile application, associated with the application may be implemented in a manner that allows dynamic positioning and display of native and web components of the mobile application.

Accordingly, system 100 includes various client machines, which may also be referred to herein as client devices, such as client machine 102. In various implementations, client machine 102 is a computing device accessible by a user. For example, client machine 102 may be a desktop computer, a laptop computer, a mobile computing device such as a smartphone, or any other suitable computing device. Accordingly, client machine 102 includes one or more input and display devices, and is communicatively coupled to communications network 130, such as the internet. In various implementations, client machine 102 comprises one or more processors configured to execute one or more applications that may utilize a user interface. Accordingly, a user may request and view various different display screens associated with such applications via client machine 102. In various implementations, a user interface may be used to present the display screen to the user, as well as receive one or more inputs from the user. In some implementations, the user interface may utilize a web browser executed on client machine 102 or may be a standalone locally executed application.

Thus, according to various implementations, client machine 102 may be a mobile device that comprises one or more processors configured to execute a mobile application that provides connectivity to a distributed application that may be implemented by application server 112 or computing platform 104. The mobile application may generate a user interface displayed in a display screen that is configured to receive inputs from the user and display information for the user. As discussed above, the user interface may include several user interface elements that may represent different components of the user interface. Such user interface elements may be native components, or may be web components.

For example, a native component may be a component that is implemented in accordance with a first computational environment. More specifically, a native component may be implemented using a code that is native to the mobile application and execution environment of the mobile device. In one example, the native component may be implemented using a Swift, Objective-C, or C++ programming language. A web component may be a component that is implemented in accordance with a second computational environment. More specifically, a web component may be implemented using a code that is native to web applications and execution environment of the web servers and internet pages. In one example, the web component may be implemented using a Java programing language. Moreover, the web component may be implemented in the user interface via a specific data object, such as a WebView. As previously discussed, the display and configuration of the WebView component may be constrained by aspects of the mobile device computational environment.

In various implementations, system 100 further includes one or more application servers, such as application server 112, and various client devices may be communicatively coupled to application server 112. In various implementations, application server 112 is configured to include software and hardware that provides an environment for the execution of an application. As will be discussed in greater detail below, application server 112 may include one or more processors and memory configured in such a manner. Accordingly, application server 112 may be configured to store program code and settings for a particular application, and may also be configured to execute the code. Moreover, application server 112 may be in communication with numerous client devices, and may implement the application in a distributed manner. In some implementations, application server 112 is further configured to generate and serve webpages that may be viewed by a user via one or more devices, such as client machine 102. Accordingly, application server 112 is configured to provide a web-based interface between a user of client machine 102 and an application that is deployed in a distributed environment. In various implementations, the application may also be configured to include an application interface that is configured to couple with one or more other entities, such as computing platform 104 discussed in greater detail below. In some implementations, application server 112 is coupled to datastore 114 which may be configured to store data associated with webpages served by application server 112, and may provide local storage for application server 112.

System 100 additionally includes computing platform 104. As shown in FIG. 1, computing platform may also be coupled to database system 108. As discussed in greater detail below with reference to at least FIG. 12, computing platform 104 is configured to host one or more distributed on-demand applications. Moreover, computing platform 104 may also include an interface configured to handle function calls, also referred to herein as server calls, generated by application server 112. The interface may be implemented using components of a database system, such as an application program interface (API), discussed in greater detail below. Accordingly, various user data may be stored and maintained by components of computing platform 104. As also shown in FIG. 1, computing platform 104 is coupled to database system 108, which is configured to provide data storage utilized by computing platform 104. As will be discussed in greater detail below, database system 108 may be configured as a multi-tenant database system that provides storage of various user data for users for various different entities, such as subscribers of services provided by computing platform 104.

It will be appreciated that the data stored in database system 108 may include additional types of information as well, such as weather data, geographical data, news data or other data from a knowledge database, emergency or health services data, or any other suitable type of information maintained by an on-demand database service provider. The data stored in database system 108 may also be CRM data maintained by an on-demand database service provider, such as Salesforce.com®, and generated based, at least in part, on one or more services or products provided by the on-demand database service provider. In one example, the data stored in database system 108 may be social network data retrieved from one or more social networks such as Facebook and LinkedIn®. Accordingly, database system 108 includes system data storage and a tenant database, as discussed in greater detail below with reference to FIG. 12. In various implementations, computing platform 104 is also coupled to communications network 130, and is communicatively coupled to application server 112 and client machine 102.

Figure 2:
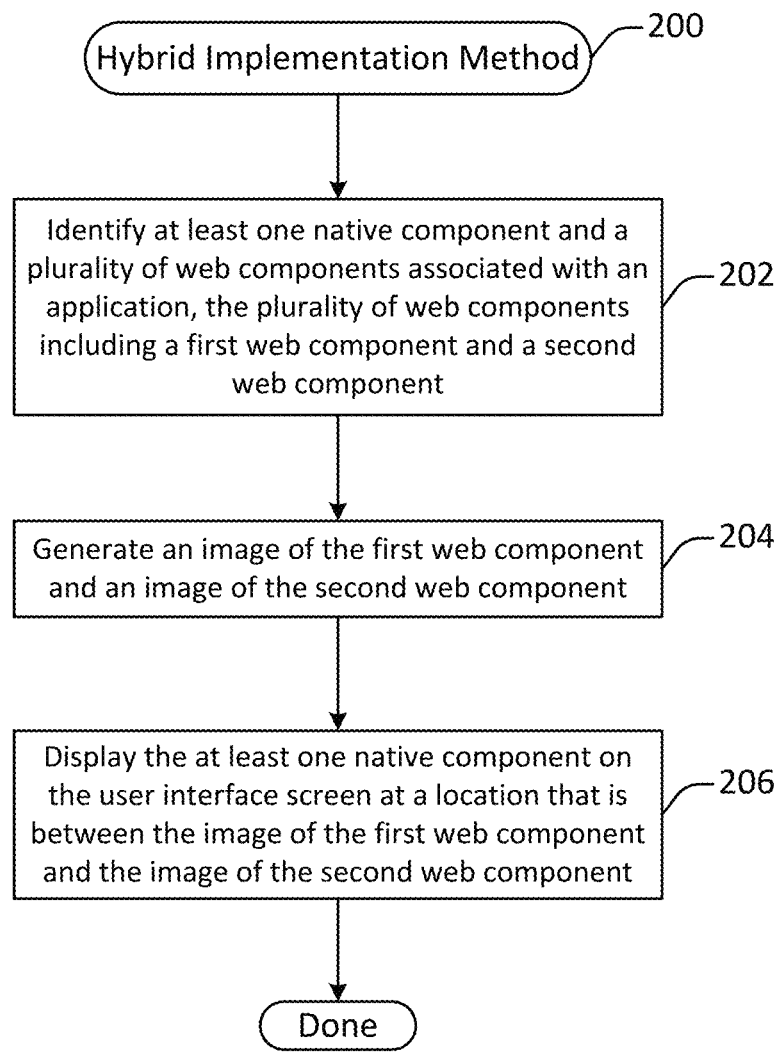
FIG. 2 illustrates an example of a method for hybrid implementation of native and web components, according to one or more implementations.

FIG. 2 illustrates an example of a method for hybrid implementation of native and web components, according to one or more implementations. As discussed above, client machines may be configured to implement mobile applications that may be configured to interface with one or more web applications and/or cloud services. In various implementations, a method, such as method 200, may be implemented to generate and display user interface screens for such applications. As will be discussed in greater detail below, such user interface screens may be implemented in a manner that allows dynamic configuration of native and web components of the mobile application.

Accordingly, method 200 may commence with operation 202 during which at least one native component and a plurality of web components may be identified. Accordingly, during operation 202, different user interface elements of a particular user interface screen may be identified, and one or more data values identifying a type and location of each user interface element may be stored. In various implementations, the plurality of web components includes a first web component and a second web component. As similarly discussed above, the at least one native component and the plurality of web components are configured to be displayed on a user interface screen.

Method 200 may proceed to operation 204 during which an image of the first web component and an image of the second web component may be generated. Accordingly, during operation 204, an image may be generated for each of the first and second web components. In some implementations, the image is generated using a native screen capture application of a mobile device. Accordingly, the image may be generated using a screen shot of the user interface that is masked and/or cropped based on the position information identified during operation 202. More specifically, the screen shot may be an image of the entire user interface screen. The position information for the first web component, for example, may identify positional boundaries of the first web component. The position information may be used to generate a mask for the screen shot, or to crop the screen shot to an image that only includes displayable pixels for the first web component. The same may be implemented for the second web component as well.

Method 200 may proceed to operation 206 during which the at least one native component may be displayed at a location on the user interface screen that is between the image of the first web component and the image of the second web component. Accordingly, a user interface screen may be generated that includes a particular arrangement of the at least one native component and the images of the first and second web components. In this way, the images that represent captures of the first and second web components may be arranged based on a custom layout, and may appear to the user as rearrangement of the first and second web components.

Figure 3:
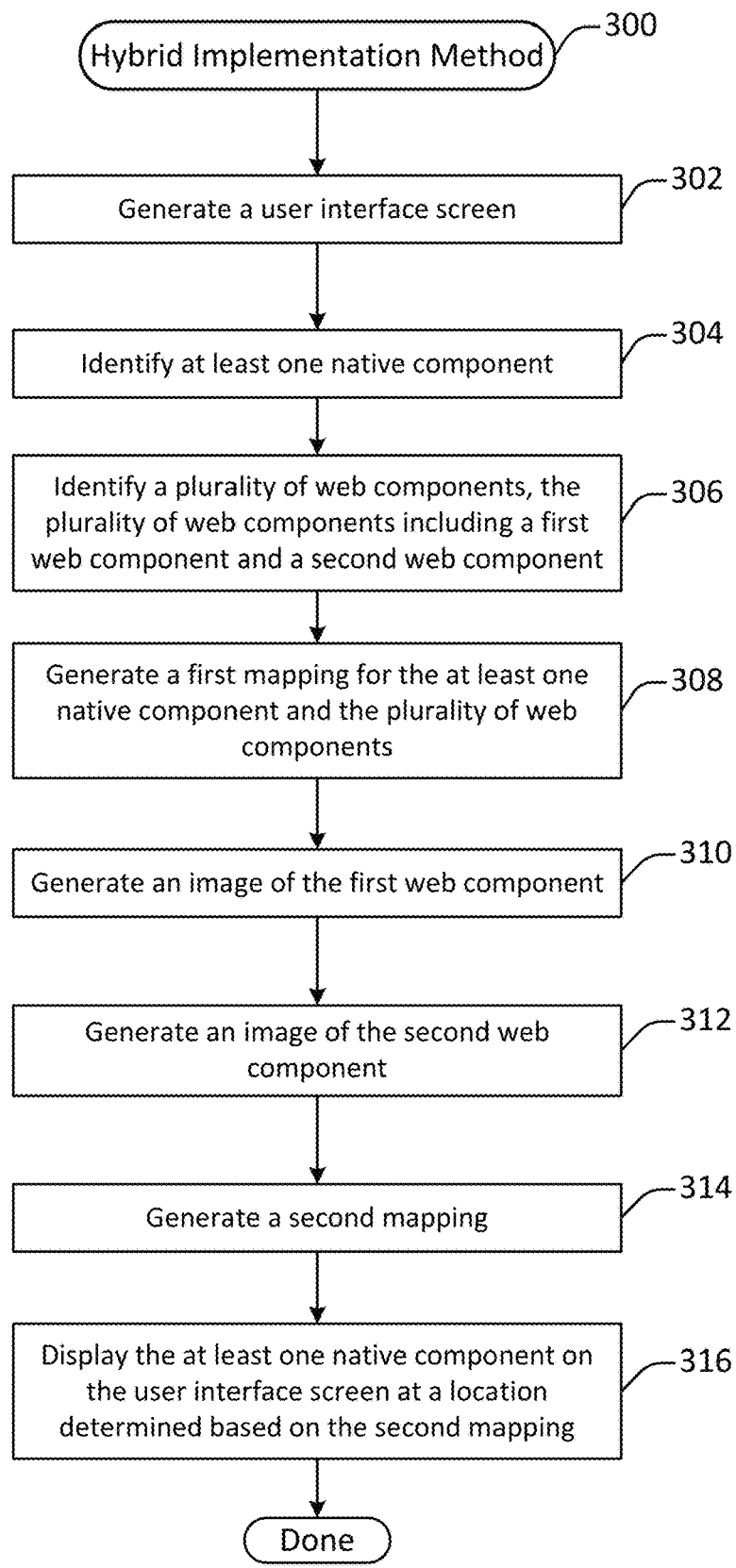
FIG. 3 illustrates another example of a method for hybrid implementation of native and web components, according to one or more implementations.

FIG. 3 illustrates another example of a method for hybrid implementation of native and web components, according to one or more implementations. As discussed above, client machines may be configured to implement mobile applications that may be configured to interface with one or more web applications and/or cloud services. In various implementations, a method, such as method 300, may be implemented to dynamically configure the display of different components of user interface screens for such applications. As will be discussed in greater detail below, one or more mappings may be generated to identify position information that may be used to generate temporary images used to represent the dynamic positioning of components within the user interface screen.

Accordingly, method 300 may commence with operation 302 during which a user interface screen may be generated. The user interface screen may be capable of being displayed in a display device of a mobile device. As will be discussed in greater detail below, the user interface screen may include multiple components rendered as user interface elements, and such components may each be configured to implement particular functionalities, such as the display of information from an on-demand service or application, or the receiving of an input from the user.

Method 300 may proceed to operation 304 during which at least one native component may be identified. Accordingly, during operation 304, components included in the user interface screen may be analyzed, and a native component may be identified. Such an identification may be made based on metadata and/or identifiers associated with the components of the user interface screen. For example, the metadata may identify a format or type of code used to implement each component, and such a type of code may be mapped to a label or flag identifying each component as a native component or web component. It will be appreciated that multiple native components may be identified.

Method 300 may proceed to operation 306 during which a plurality of web components may be identified. Accordingly, components included in the user interface screen may be analyzed, and web components may also be identified. As similarly discussed above, such an identification may be made based on metadata and/or identifiers associated with the components of the user interface screen. In some implementations, the plurality of web components includes a first web component and a second web component.

Method 300 may proceed to operation 308 during which a first mapping may be generated. In various implementations, the first mapping is a data structure that is configured to store position information identifying a position and boundary of each component included in the user interface screen. The position may be identified based on a custom referencing scheme. For example, a particular corner, such as a bottom left corner, of the user interface screen, may be identified as an origin or reference point, and locations included in the remainder of the user interface screen may be identified based on positional offsets from that reference point. In one example, the positional offset may be represented as a set of coordinates identifying a horizontal and vertical distance or offset. In this way, parameters and metadata of the components themselves may be translated to a first mapping that identifies a position and contour for each identified component.

In various implementations, the position of user interface elements is determined based on a number of points (which may be pixels) from a specific determined origin. In one example, an operating system or computing environment of the mobile device, such as OS, may determine that origin coordinates of x: 0 and y: 0 identify a point at the top left of a display screen. Other implementations, such as those using OpenGL, ma use a determined origin where x: 0, y: 0 identifies a bottom left corner of the display screen.

In some implementations, user interface elements have predetermined geometries. For example, they may be rectangles. Accordingly, they may have associated metadata that identifies their size and width. Accordingly, such dimension information may be used in combination with reference points for user interface elements to identify a positions of the user interface elements. In one example, a reference point may be an x,y coordinate that identifies a corner of a rectangle, or some other part of the rectangle, such as a center of the rectangle. While some examples of representing user interface elements have been disclosed, it will be appreciated that any suitable referencing technique may be used.

Method 300 may proceed to operation 310 during which an image of the first web component may be generated. Accordingly, during operation 310, an image may be generated for the first web component. As similarly discussed above, the image is generated using a native screen capture application of a mobile device. Accordingly, the image may be generated using a screen shot of the user interface that is masked and/or cropped based on position information included in the first mapping. As discussed above, the screen shot may be an image of the entire user interface screen, and the position information for the first web component, for example, may identify positional boundaries of the first web component. The position information may be used to generate a mask for the screen shot, or to crop the screen shot to an image that only includes displayable pixels for the first web component.

Method 300 may proceed to operation 312 during which an image of the second web component may be generated. Accordingly, during operation 312, an image may be generated for the second web component. As similarly discussed above, the screen shot may be an image of the entire user interface screen, and the position information for the second web component, for example, may identify positional boundaries of the second web component. The position information may be used to generate a mask for the screen shot, or to crop the screen shot to an image that only includes displayable pixels for the second web component. While operation 312 describes a second iteration of the image capture, it will be appreciated that a single screen shot may be used to generate both the image of the first web component and the image of the second web component, as well as any other appropriate images of components by using copies of the captured screen shot.

Method 300 may proceed to operation 314 during which a second mapping may be generated. In various implementations, the second mapping may be generated based on one or more received inputs that indicate a position of a component should be changed, or some other change should be made to the arrangement of components, such as the addition or removal of a component. Accordingly, an input may be received that identifies a change to be made to a layout or configuration of the user interface screen, and the second mapping may be generated that identifies updated positions for each of the components. In this way, the second mapping may represent an updated custom implementation of the user interface screen.

Method 300 may proceed to operation 316 during which the at least one native component may be displayed at a location on the user interface screen that is determined based, at least in part, on the second mapping. Accordingly, the native component may be displayed at a location determined based on the second mapping. Moreover, the images of the first web component and the second web component may also be displayed at locations determined based on the second mapping. In one example, the new positions identified by the second mapping are different than the old positions identified by the first mapping. In this way, the dynamic arrangement of the images of the first web component and the second web component provide the appearance of the dynamic arrangement of the web components themselves while adhering to the constraints of positioning such components, which may be included in one or more WebView components.

Figure 4:
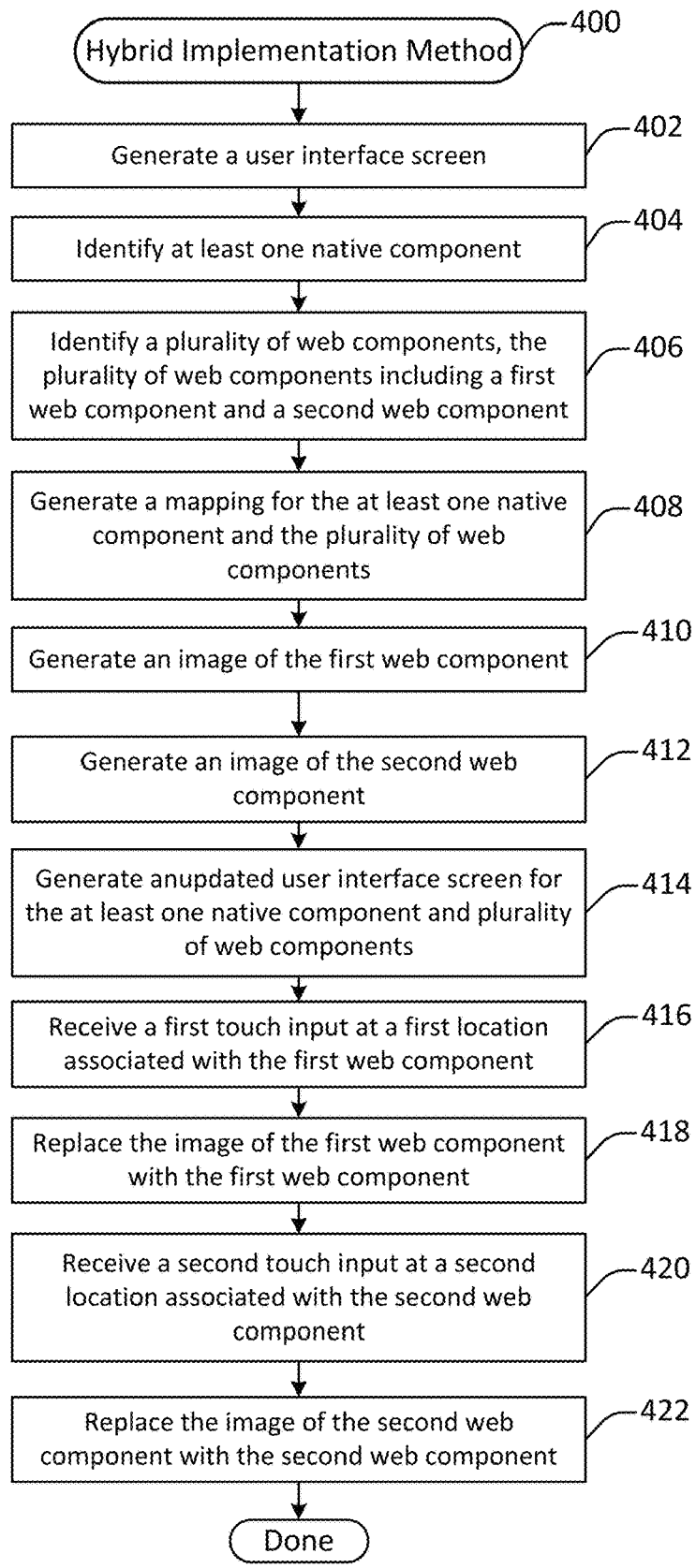
FIG. 4 illustrates an example of a method for dynamic positioning of native and web components, according to one or more implementations.

FIG. 4 illustrates an example of a method for dynamic positioning of native and web components, according to one or more implementations. As discussed above, client machines may be configured to implement mobile applications that may be configured to interface with one or more web applications and/or cloud services. In various implementations, a method, such as method 400, may be implemented to dynamically configure the display of different components of user interface screens for such applications. As will be discussed in greater detail below, one or more touch inputs may be received, and dynamic positioning of components may be implemented within the user interface screen to support such touch inputs with components, such as WebView components, in dynamically configurable locations.

Accordingly, method 400 may commence with operation 402 during which a user interface screen capable of being displayed in a display device of a mobile device may be generated. As similarly discussed above, the user interface screen may include multiple components rendered as user interface elements, and such components may each be configured to implement particular functionalities, such as the display of information from an on-demand service or application, or the receiving of an input from the user.

Method 400 may proceed to operation 404 during which at least one native component may be identified. Accordingly, during operation 404, components included in the user interface screen may be analyzed, and a native component may be identified. Such an identification may be made based on metadata and/or identifiers associated with the components of the user interface screen. As discussed above, a type of code may be mapped to a label or flag identifying each component as a native component or web component. It will be appreciated that multiple native components may be identified.

Method 400 may proceed to operation 406 during which a plurality of web components may be identified. Accordingly, components included in the user interface screen may be analyzed, and web components may also be identified. As similarly discussed above, such an identification may be made based on metadata and/or identifiers associated with the components of the user interface screen. In some implementations, the plurality of web components includes a first web component and a second web component.

Method 400 may proceed to operation 408 during which a mapping may be generated. As similarly discussed above, the first mapping may be a data structure that is configured to store position information identifying a position and boundary of each component included in the user interface screen. The position may be identified based on a custom referencing scheme that may include an origin or reference point, and locations identified based on positional offsets from that reference point. For example, the positional offset may be represented as a set of coordinates identifying a horizontal and vertical distance or offset. In this way, parameters and metadata of the components themselves may be translated to a mapping that identifies a position and contour for each identified component.

Method 400 may proceed to operation 410 during which an image of the first web component may be generated. Accordingly, during operation 410, an image may be generated for the first web component. As similarly discussed above, the image is generated using a native screen capture application of a mobile device. Accordingly, the image may be generated using a screen shot of the user interface that is masked and/or cropped based on position information included in the mapping. In this way, the position information may be used to generate a mask for the screen shot, or to crop the screen shot to an image that only includes displayable pixels for the first web component.

Method 400 may proceed to operation 412 during which an image of the second web component may be generated. Accordingly, during operation 412, an image may be generated for the second web component. As similarly discussed above, the screen shot may be an image of the entire user interface screen, and the position information for the second web component, for example, may identify positional boundaries of the second web component. In this way, the position information may be used to generate a mask for the screen shot, or to crop the screen shot to an image that only includes displayable pixels for the second web component. While operation 412 describes a second iteration of the image capture, it will be appreciated that a single screen shot may be used to generate both the image of the first web component and the image of the second web component, as well as any other appropriate images of components by using copies of the captured screen shot.

Method 400 may proceed to operation 414 during which an updated user interface screen may be generated based, at least in part, on the mapping. In various implementations, the updated user interface screen may include a stack of visible layers that are rendered and displayed as single user interface screen image. More specifically, each of the components discussed above may be stored as a layer in a vertical stack of layers that is ultimately flattened and displayed in a display device. In one example, the native component, the image of the first web component, and the image of the second web component may be stored as layers in the stack, where each layer is positioned based on the mapping. In this way, displayed information for each component is maintained as a separate layer of the user interface screen.

Method 400 may proceed to operation 416 during which a first touch input may be received at a first location. As similarly discussed above, the user interface screen may be displayed in a display device that is a touch device. Accordingly, a user may provide an input that is a touch input at a particular location on the user interface screen. In one example, the first touch input is received at a location that corresponds to the location of the image of the first web component.

Method 400 may proceed to operation 418 during which the image of the first web component may be replaced by the first web component. Accordingly, the image of the first web component may be removed, a mask may be applied to the first web component, and the masked-first web component may be positioned at the first location. As discussed above, the first web component may be included in a WebView. Accordingly, the WebView may be positioned at the first location.

Method 400 may proceed to operation 420 during which a second touch input may be received at a second location. As similarly discussed above, a user may provide an input that is a touch input at a particular location on the user interface screen. In one example, the second touch input is received at a location that corresponds to the location of the image of the second web component.

Method 400 may proceed to operation 422 during which the image of the second web component may be replaced by the second web component. Accordingly, the image of the second web component may be removed, a mask may be applied to the second web component, and the masked-second web component may be positioned at the second location. As discussed above, the second web component may also be implanted using a WebView. Accordingly, the WebView may be positioned at the second location. In various implementations, the image of the first web component may be re-displayed at the first location prior to operation 422. In some implementations, a new image may be captured for the first web component and the new image may be displayed. This additional image capture may be implemented in response to identifying a change in the contents of the first web component.

Figure 5:
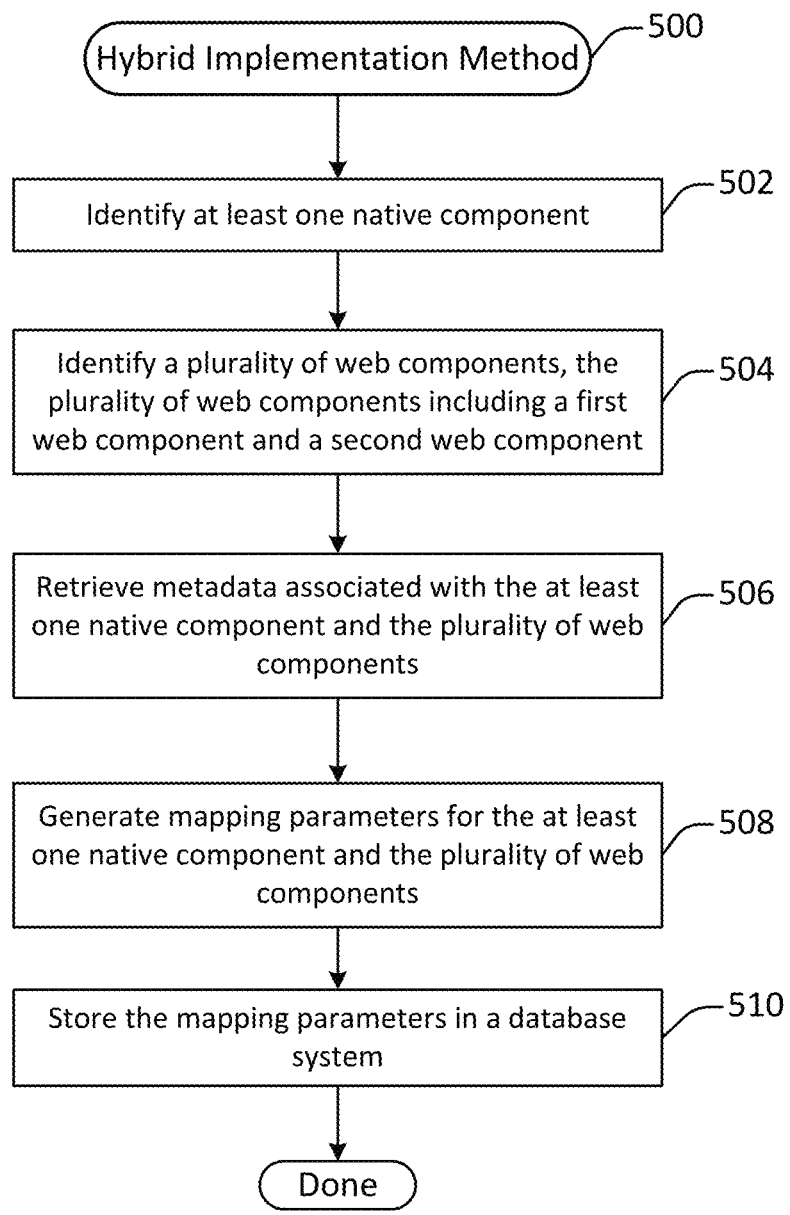
FIG. 5 illustrates an example of pre-processing of mapping parameters associated with native and web components, according to one or more implementations.

FIG. 5 illustrates an example of pre-processing of mapping parameters associated with native and web components, according to one or more implementations. As discussed above, various mappings may be generated to identify positions of components of user interface screens. In various implementations, a method, such as method 500, may be implemented to distribute processing operations associated with the generation of such mappings to reduce a processing overhead that may be incurred when such mappings are generated dynamically.

Accordingly, method 500 may commence with operation 502 during which at least one native component may be identified. As similarly discussed above, components included in a user interface screen may be analyzed, and a native component may be identified based on available metadata and/or identifiers associated with the components of the user interface screen. In various implementations, the user interface screen may be currently being used, or may be a cached user interface screen. In various implementations, the at least one native component is identified based on one or more storage locations of the mobile application associated with the user interface screen. For example, a storage location associated with the mobile application may store data structures representing native components used during the execution of the mobile application.

Method 500 may proceed to operation 504 during which a plurality of web components may be identified. As similarly discussed above, the plurality of web components includes a first web component and a second web component which may be identified based on an available user interface screen, and such an identification may be made based on metadata and/or identifiers associated with the components of the user interface screen. As also discussed above, the user interface screen may be currently being used, or may be a cached user interface screen. Moreover, the web components may be identified based on one or more storage locations of the mobile application associated with the user interface screen. For example, a storage location associated with the mobile application may store data structures representing web components used during the execution of the mobile application.

Method 500 may proceed to operation 506 during which metadata associated with the at least one native component and the plurality of web components may be retrieved. Accordingly, metadata may be retrieved for each of the identified components. The metadata may be retrieved from the storage locations at the mobile device, or may be retrieved from a remote location if such data is stored remotely. For example, such storage locations may be managed by a computing platform, and the appropriate metadata may be retrieved from a database associated with the computing platform.

Method 500 may proceed to operation 508 during which mapping parameters may be generated for each of the at least one native component and the plurality of web components based, at least in part, on the metadata. In various implementations, the mapping parameters may be data values that identify various display aspects of each of the components. For example, such mapping parameters may identify a size of each of the components using dimensions, such as a height and width represented as pixels or an arbitrary unit of length.

Method 500 may proceed to operation 510 during which the mapping parameters may be stored in a database system. Accordingly, the mapping parameters may be stored in a remote location associated with the computing platform if appropriate. In another example, the mapping parameters may be stored locally at the mobile device. Accordingly, if dynamic configuration of the components is subsequently implemented, as discussed above, the determination of the mapping parameters underlying the mapping has already been implemented, and processing overhead at the time of dynamic reconfiguration is reduced.

Figure 6:
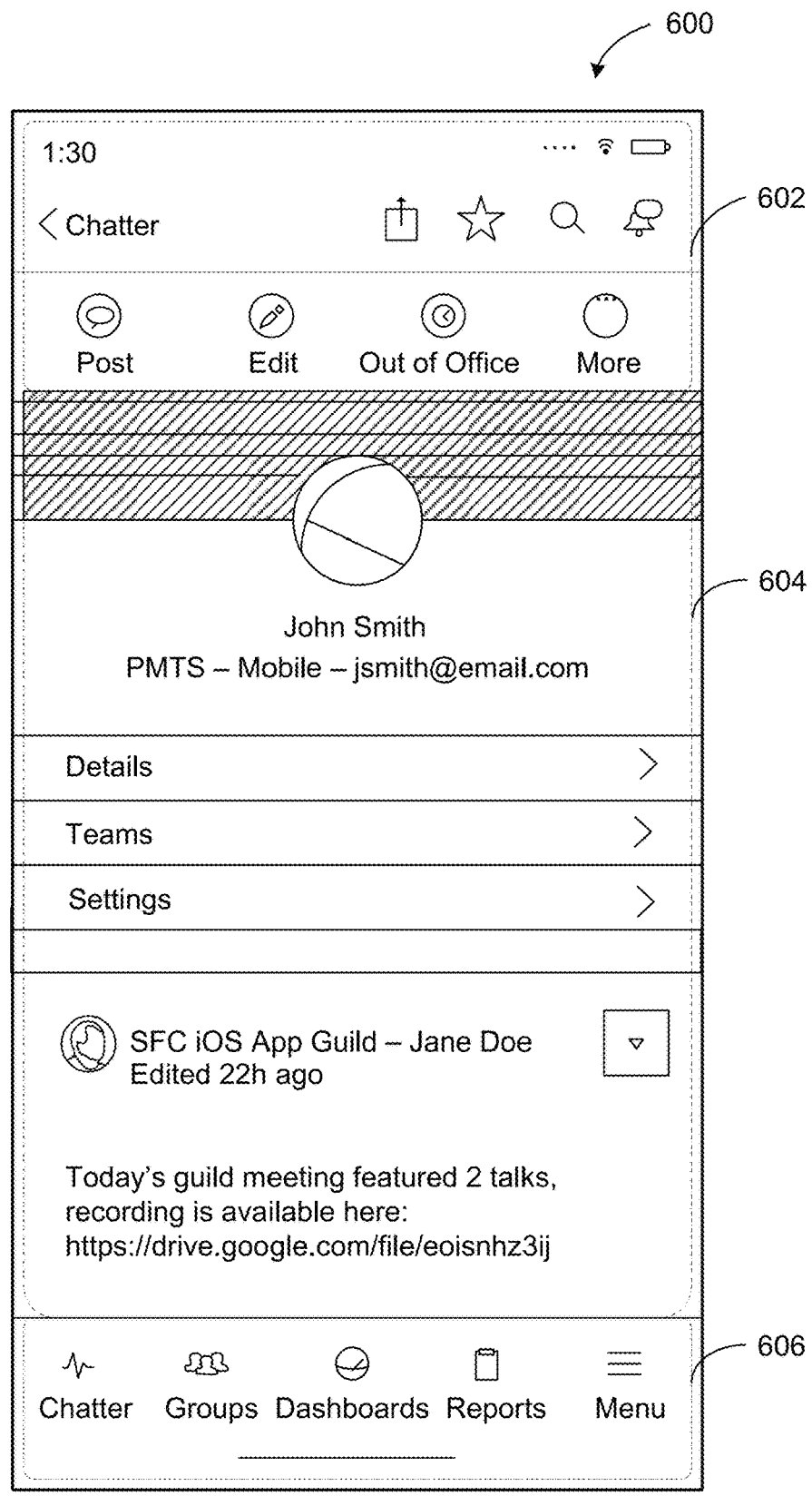
FIGS. 6, 7, 8, 9, 10, and 11 illustrate examples of user interface screens associated with hybrid implementations of native and web components, according to one or more implementations.

FIG. 6 illustrates an example of a user interface screen associated with a hybrid implementation of native and web components, according to one or more implementations. Accordingly, user interface screen 600 illustrates an example of various components that may be included and displayed in a user interface screen of a mobile application. In one example, user interface screen 600 may be generated by a mobile device, and may be used to access a user's profile for an on-demand service. As shown in user interface screen 600, there may be one or more native components, such as first native component 602 and second native component 606. As discussed above, such native components are instantiated using a native code or format, and may be used to execute code locally on a mobile device. Moreover, there may also be a web component, such as web component 604, which is a component of a WebView configured as a self-contained web browser that is configured to display web content.

Figure 7:
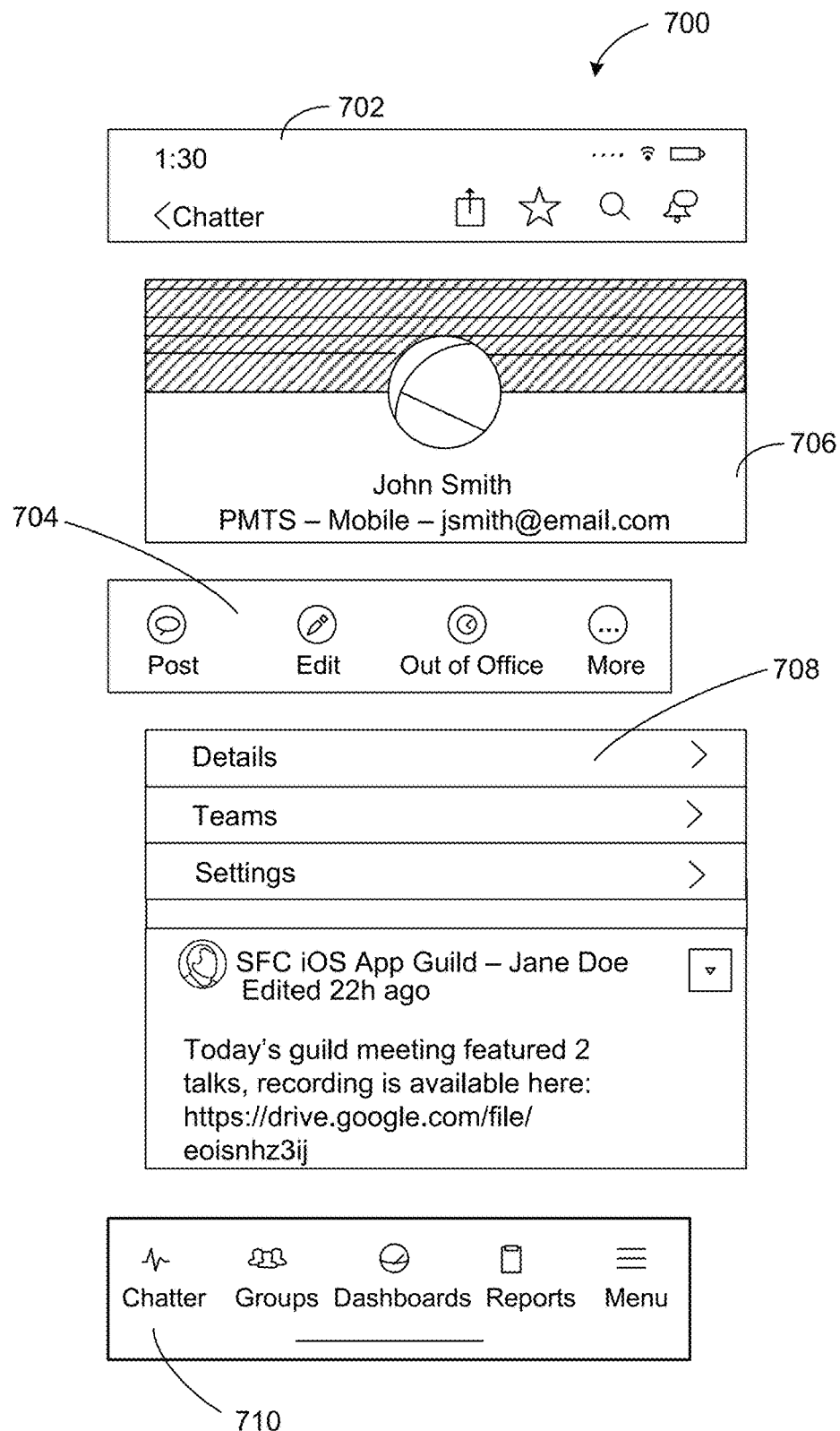

FIG. 7 illustrates an example of various components utilized during a hybrid implementation of native and web components, according to one or more implementations. Accordingly, image 700 illustrates an example of user interface screen 600 discussed above where multiple different user interface elements have been identified, and images have been generated for each one. For example, first image 702 and second image 704 have been generated for a first native component, third image 706 and fourth image 708 have been generated for web components included in a WebView, and fifth image 710 has been generated for a second native component. Thus, discrete components of the WebView have been identified, and images have been generated for each one.

Figure 8:
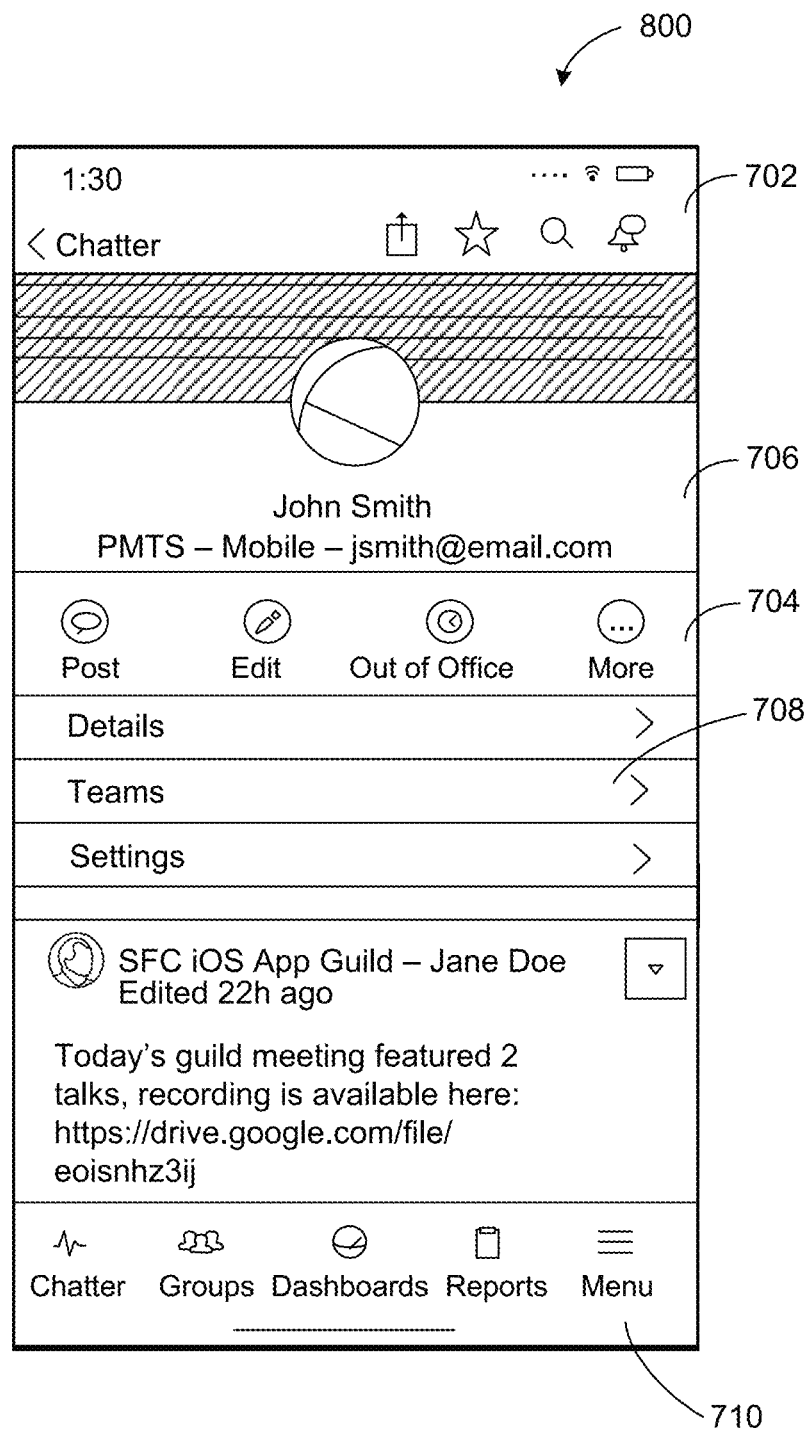

FIG. 8 illustrates an example of a user interface screen associated with a hybrid implementation of native and web components, according to one or more implementations. Accordingly, user interface screen 800 illustrates an example of an updated and dynamically configured user interface screen where a user has dynamically configured the presentation of his user profile, and the presentation of native and web components underlying that user profile. As shown in FIG. 8, the images of the components discussed above with reference to FIG. 7 have been arranged to implement a dynamic reconfiguration, as may be implemented based on a custom mapping defined by a user of the mobile application. More specifically, user interface screen 800 includes an arrangement of first image 702 associated with a first native component, third image 706 associated with a web component of the WebView, second image 704 associated with the first native component, fourth image 708 associated with a web component of the WebView, and fifth image 710 associated with a second native component. It will be appreciated that while web components of the WebView have been split and displayed in different locations, the display is still using a single WebView. Accordingly, multiple images may be generated and utilized for discrete components of a single WebView.

Figure 9:
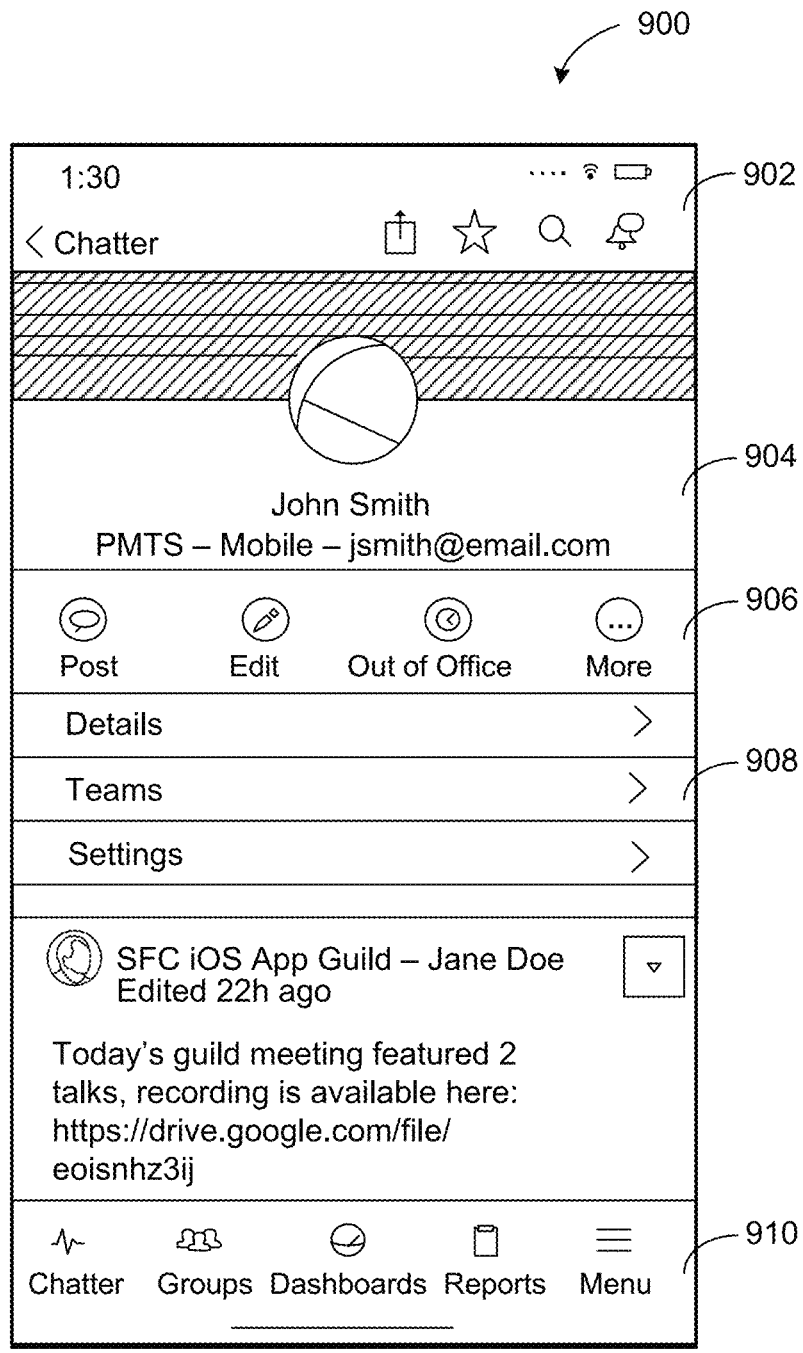
Figure 10:
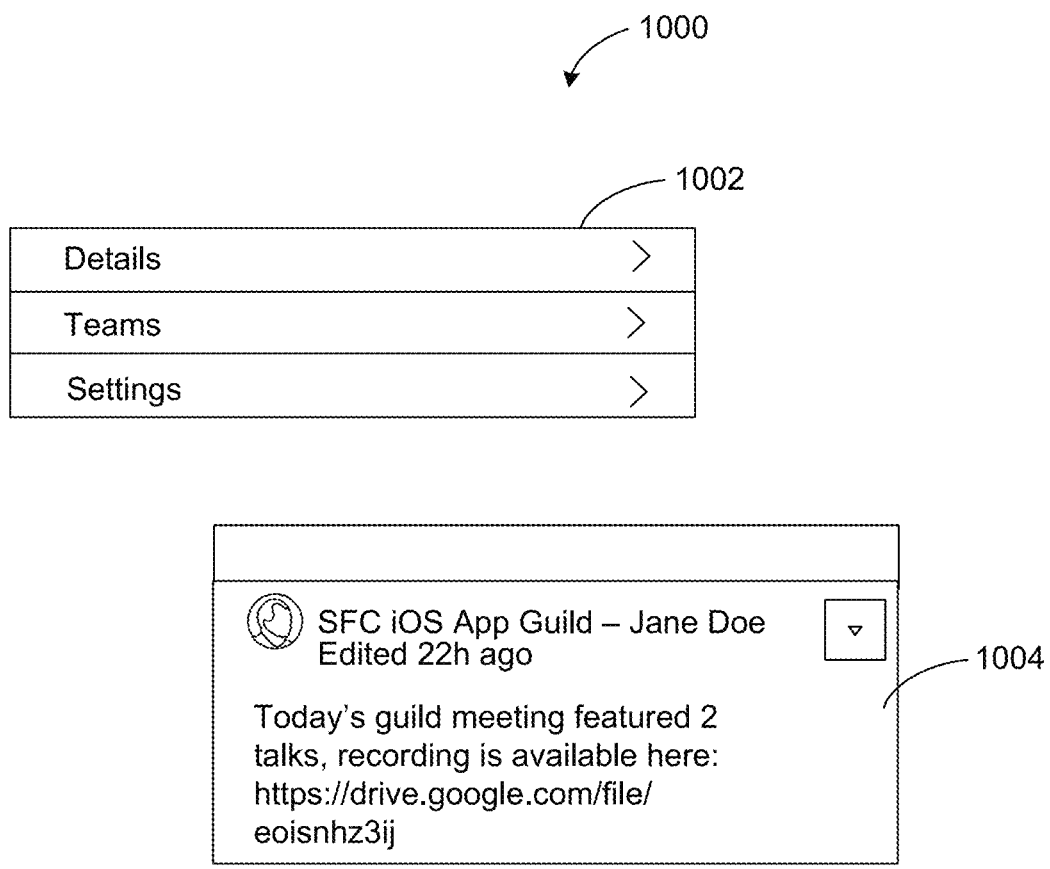

FIG. 9 illustrates an example of a user interface screen associated with a hybrid implementation of native and web components, according to one or more implementations. As shown in FIG. 9, user interface screen 900 may include first image 902 associated with a first native component, second image 904 associated with a web component of a WebView, third image 906 associated with the first native component, fourth image 908 associated with a web component of the WebView, and fifth image 910 associated with a second native component. FIG. 10 illustrates how specific user interface elements underlying web components can be identified and used to generate additional images of sixth image 1002 and seventh image 1004.

Figure 11:
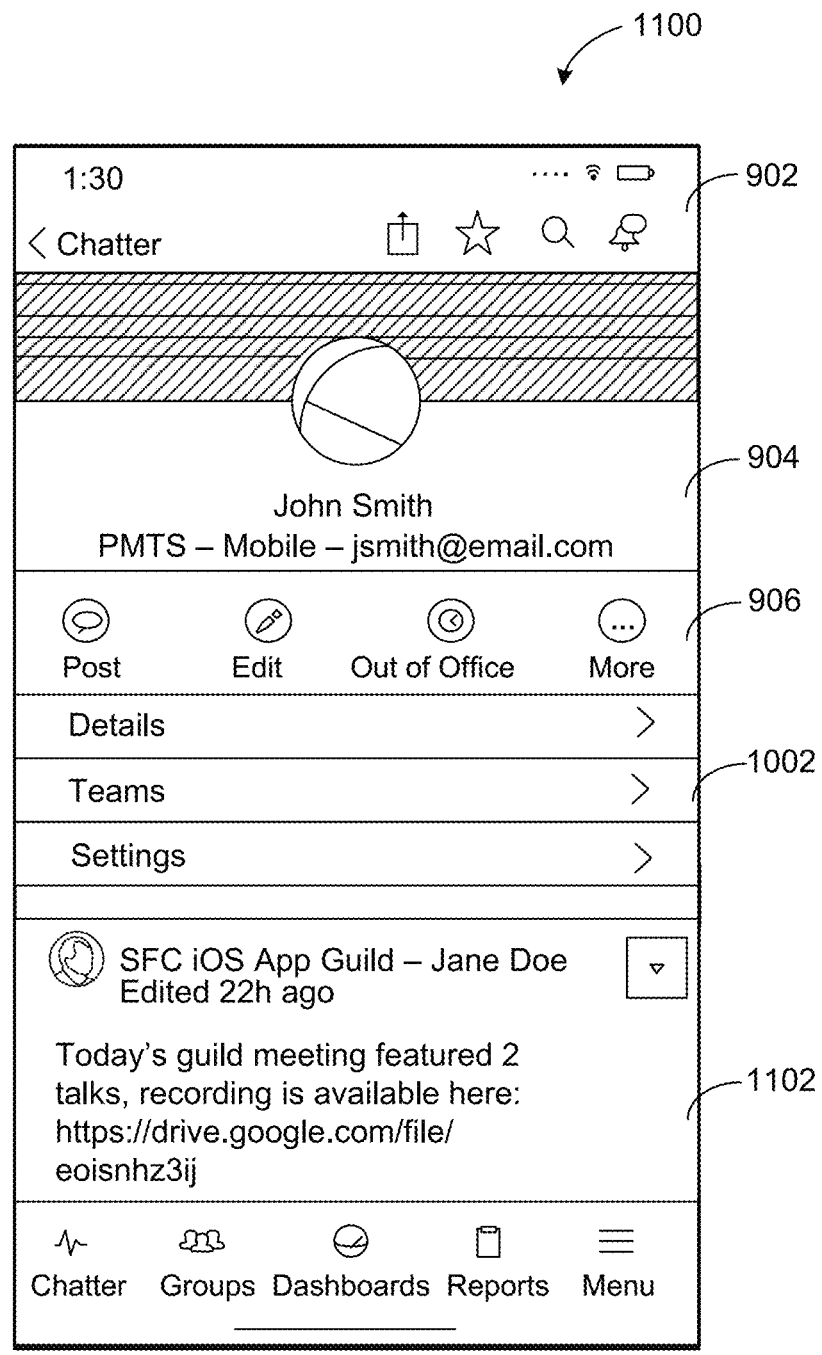

FIG. 11 illustrates an example of a user interface screen associated with a hybrid implementation of native and web components, according to one or more implementations. Accordingly, as shown in user interface screen 1100, components may be modified and/or replaced. More specifically, user interface screen 1100 includes first image 902 associated with a first native component, second image 904 associated with a web component of a WebView, third image 906 associated with the first native component, sixth image 1002 associated with a web component of the WebView, and eight image 1102 associated with a second native component. In this example, eighth image 1102 has been generated such that the feed that was previously displayed using the WebView component is now displayed using a native component.

Figure 12:
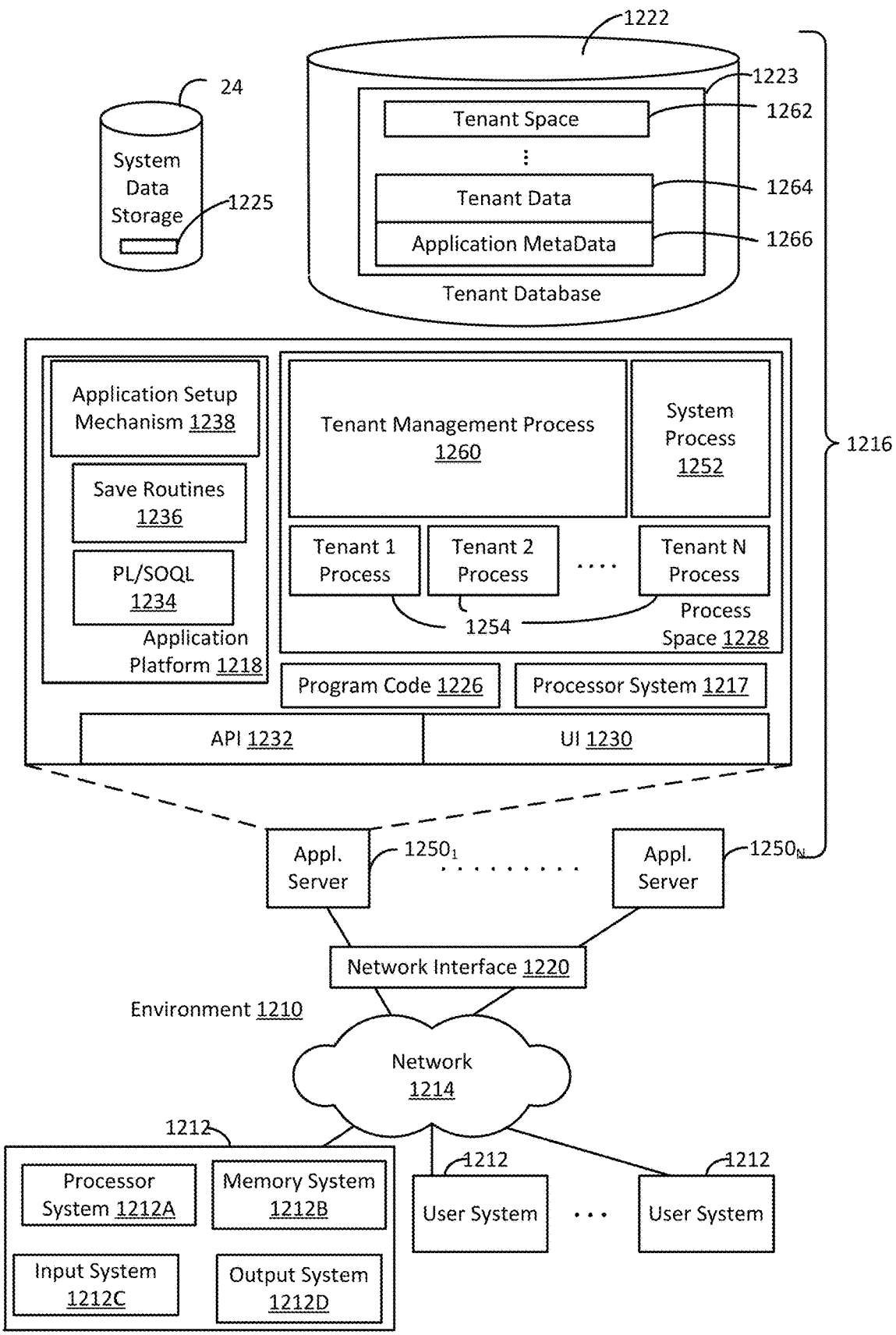
FIG. 12 shows a block diagram of an example of an environment that includes an on-demand database service configured in accordance with some implementations.

FIG. 12 shows a block diagram of an example of an environment 1210 that includes an on-demand database service configured in accordance with some implementations. Environment 1210 may include user systems 1212, network 1214, database system 1216, processor system 1217, application platform 1218, network interface 1220, tenant data storage 1222, tenant data 1223, system data storage 1224, system data 1225, program code 1226, process space 1228, User Interface (UI) 1230, Application Program Interface (API) 1232, PL/SOQL 1234, save routines 1236, application setup mechanism 1238, application servers 1250-1 through 1250-N, system process space 1252, tenant process spaces 1254, tenant management process space 1260, tenant storage space 1262, user storage 1264, and application metadata 1266. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1216, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 1218 may be a framework that allows the creation, management, and execution of applications in system 1216. Such applications may be developed by the database service provider or by users or third-party application developers accessing the service. Application platform 1218 includes an application setup mechanism 1238 that supports application developers' creation and management of applications, which may be saved as metadata into tenant data storage 1222 by save routines 1236 for execution by subscribers as one or more tenant process spaces 1254 managed by tenant management process 1260 for example. Invocations to such applications may be coded using PL/SOQL 1234 that provides a programming language style interface extension to API 1232. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 1266 for a subscriber making such an invocation. Such system processes may also manage execution of application metadata 1266 as an application in a virtual machine.

In some implementations, each application server 1250 may handle requests for any user associated with any organization. A load balancing function (e.g., an F5 Big-IP load balancer) may distribute requests to the application servers 1250 based on an algorithm such as least-connections, round robin, observed response time, etc. Each application server 1250 may be configured to communicate with tenant data storage 1222 and the tenant data 1223 therein, and system data storage 1224 and the system data 1225 therein to serve requests of user systems 1212. The tenant data 1223 may be divided into individual tenant storage spaces 1262, which can be either a physical arrangement and/or a logical arrangement of data. Within each tenant storage space 1262, user storage 1264 and application metadata 1266 may be similarly allocated for each user. For example, a copy of a user's most recently used (MRU) items might be stored to user storage 1264. Similarly, a copy of MRU items for an entire tenant organization may be stored to tenant storage space 1262. A UI 1230 provides a user interface and an API 1232 provides an application programming interface to system 1216 resident processes to users and/or developers at user systems 1212.

System 1216 may implement a web-based distributed application system. For example, in some implementations, system 1216 may include application servers configured to implement and execute distributed software applications. The application servers may be configured to provide related data, code, forms, web pages and other information to and from user systems 1212. Additionally, the application servers may be configured to store information to, and retrieve information from a database system. Such information may include related data, objects, and/or Webpage content. With a multi-tenant system, data for multiple tenants may be stored in the same physical database object in tenant data storage 1222, however, tenant data may be arranged in the storage medium(s) of tenant data storage 1222 so that data of one tenant is kept logically separate from that of other tenants. In such a scheme, one tenant may not access another tenant's data, unless such data is expressly shared.

Several elements in the system shown in FIG. 12 include conventional, well-known elements that are explained only briefly here. For example, user system 1212 may include processor system 1212A, memory system 1212B, input system 1212C, and output system 1212D. A user system 1212 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 1212 to access, process and view information, pages and applications available from system 1216 over network 1214. Network 1214 may be any network or combination of networks of devices that communicate with one another, such as any one or any combination of a LAN (local area network), WAN (wide area network), wireless network, or other appropriate configuration.

The users of user systems 1212 may differ in their respective capacities, and the capacity of a particular user system 1212 to access information may be determined at least in part by "permissions" of the particular user system 1212. As discussed herein, permissions generally govern access to computing resources such as data objects, components, and other entities of a computing system, such as a social networking system, and/or a CRM database system. "Permission sets" generally refer to groups of permissions that may be assigned to users of such a computing environment. For instance, the assignments of users and permission sets may be stored in one or more databases of System 1216. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1216 may provide on-demand database service to user systems 1212 using an MTS arrangement. By way of example, one tenant organization may be a company that employs a sales force where each salesperson uses system 1216 to manage their sales process. Thus, a user in such an organization may maintain contact data, leads data, customer follow-up data, performance data, goals and progress data, etc., all applicable to that user's personal sales process (e.g., in tenant data storage 1222). In this arrangement, a user may manage his or her sales efforts and cycles from a variety of devices, since relevant data and applications to interact with (e.g., access, view, modify, report, transmit, calculate, etc.) such data may be maintained and accessed by any user system 1212 having network access.

When implemented in an MTS arrangement, system 1216 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1216 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1216 may also maintain system-level data usable by multiple tenants or other data. Such system-level data may include industry reports, news, postings, and the like that are sharable between tenant organizations.

In some implementations, user systems 1212 may be client systems communicating with application servers 1250 to request and update system-level and tenant-level data from system 1216. By way of example, user systems 1212 may send one or more queries requesting data of a database maintained in tenant data storage 1222 and/or system data storage 1224. An application server 1250 of system 1216 may automatically generate one or more SQL statements (e.g., one or more SQL queries) that are designed to access the requested data. System data storage 1224 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 13A:
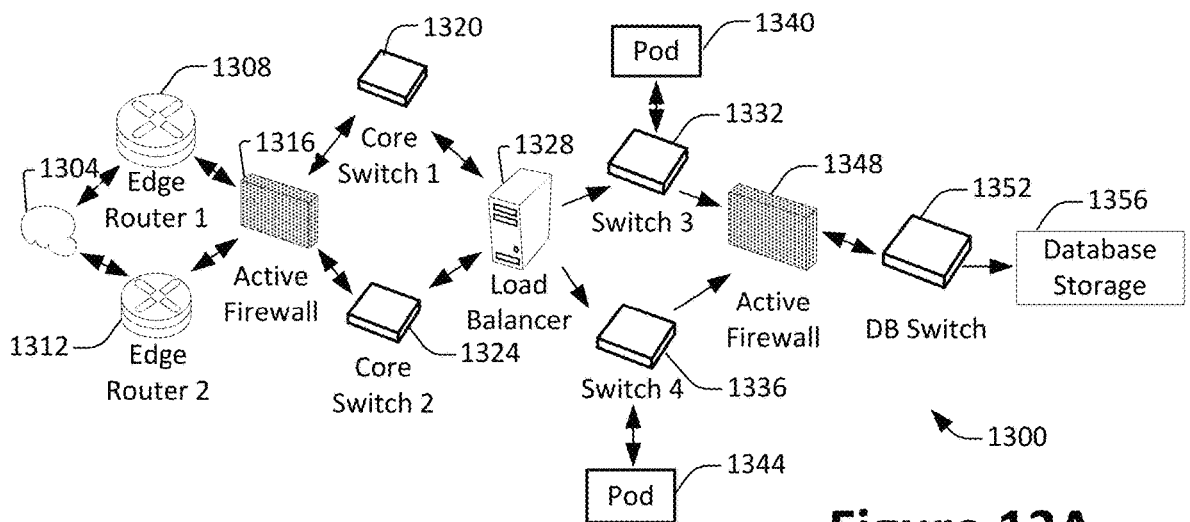
FIG. 13A shows a system diagram of an example of architectural components of an on-demand database service environment, configured in accordance with some implementations.

FIG. 13A shows a system diagram of an example of architectural components of an on-demand database service environment 1300, configured in accordance with some implementations. A client machine located in the cloud 1304 may communicate with the on-demand database service environment via one or more edge routers 1308 and 1312. A client machine may include any of the examples of user systems ?12 described above. The edge routers 1308 and 1312 may communicate with one or more core switches 1320 and 1324 via firewall 1316. The core switches may communicate with a load balancer 1328, which may distribute server load over different pods, such as the pods 1340 and 1344 by communication via pod switches 1332 and 1336. The pods 1340 and 1344, which may each include one or more servers and/or other computing resources, may perform data processing and other operations used to provide on-demand services. Components of the environment may communicate with a database storage 1356 via a database firewall 1348 and a database switch 1352.

Accessing an on-demand database service environment may involve communications transmitted among a variety of different components. The environment 1300 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 13A and 13B.

The cloud 1304 refers to any suitable data network or combination of data networks, which may include the Internet. Client machines located in the cloud 1304 may communicate with the on-demand database service environment 1300 to access services provided by the on-demand database service environment 1300. By way of example, client machines may access the on-demand database service environment 1300 to retrieve, store, edit, and/or process metadata and/or mapping information.

In some implementations, the edge routers 1308 and 1312 route packets between the cloud 1304 and other components of the on-demand database service environment 1300. The edge routers 1308 and 1312 may employ the Border Gateway Protocol (BGP). The edge routers 1308 and 1312 may maintain a table of IP networks or 'prefixes', which designate network reachability among autonomous systems on the internet.

In one or more implementations, the firewall 1316 may protect the inner components of the environment 1300 from internet traffic. The firewall 1316 may block, permit, or deny access to the inner components of the on-demand database service environment 1300 based upon a set of rules and/or other criteria. The firewall 1316 may act as one or more of a packet filter, an application gateway, a stateful filter, a proxy server, or any other type of firewall.

In some implementations, the core switches 1320 and 1324 may be high-capacity switches that transfer packets within the environment 1300. The core switches 1320 and 1324 may be configured as network bridges that quickly route data between different components within the on-demand database service environment. The use of two or more core switches 1320 and 1324 may provide redundancy and/or reduced latency.

In some implementations, communication between the pods 1340 and 1344 may be conducted via the pod switches 1332 and 1336. The pod switches 1332 and 1336 may facilitate communication between the pods 1340 and 1344 and client machines, for example via core switches 1320 and 1324. Also or alternatively, the pod switches 1332 and 1336 may facilitate communication between the pods 1340 and 1344 and the database storage 1356. The load balancer 1328 may distribute workload between the pods, which may assist in improving the use of resources, increasing throughput, reducing response times, and/or reducing overhead. The load balancer 1328 may include multilayer switches to analyze and forward traffic.

In some implementations, access to the database storage 1356 may be guarded by a database firewall 1348, which may act as a computer application firewall operating at the database application layer of a protocol stack. The database firewall 1348 may protect the database storage 1356 from application attacks such as structure query language (SQL) injection, database rootkits, and unauthorized information disclosure. The database firewall 1348 may include a host using one or more forms of reverse proxy services to proxy traffic before passing it to a gateway router and/or may inspect the contents of database traffic and block certain content or database requests. The database firewall 1348 may work on the SQL application level atop the TCP/IP stack, managing applications' connection to the database or SQL management interfaces as well as intercepting and enforcing packets traveling to or from a database network or application interface.

In some implementations, the database storage 1356 may be an on-demand database system shared by many different organizations. The on-demand database service may employ a single-tenant approach, a multi-tenant approach, a virtualized approach, or any other type of database approach. Communication with the database storage 1356 may be conducted via the database switch 1352. The database storage 1356 may include various software components for handling database queries. Accordingly, the database switch 1352 may direct database queries transmitted by other components of the environment (e.g., the pods 1340 and 1344) to the correct components within the database storage 1356.

Figure 13B:
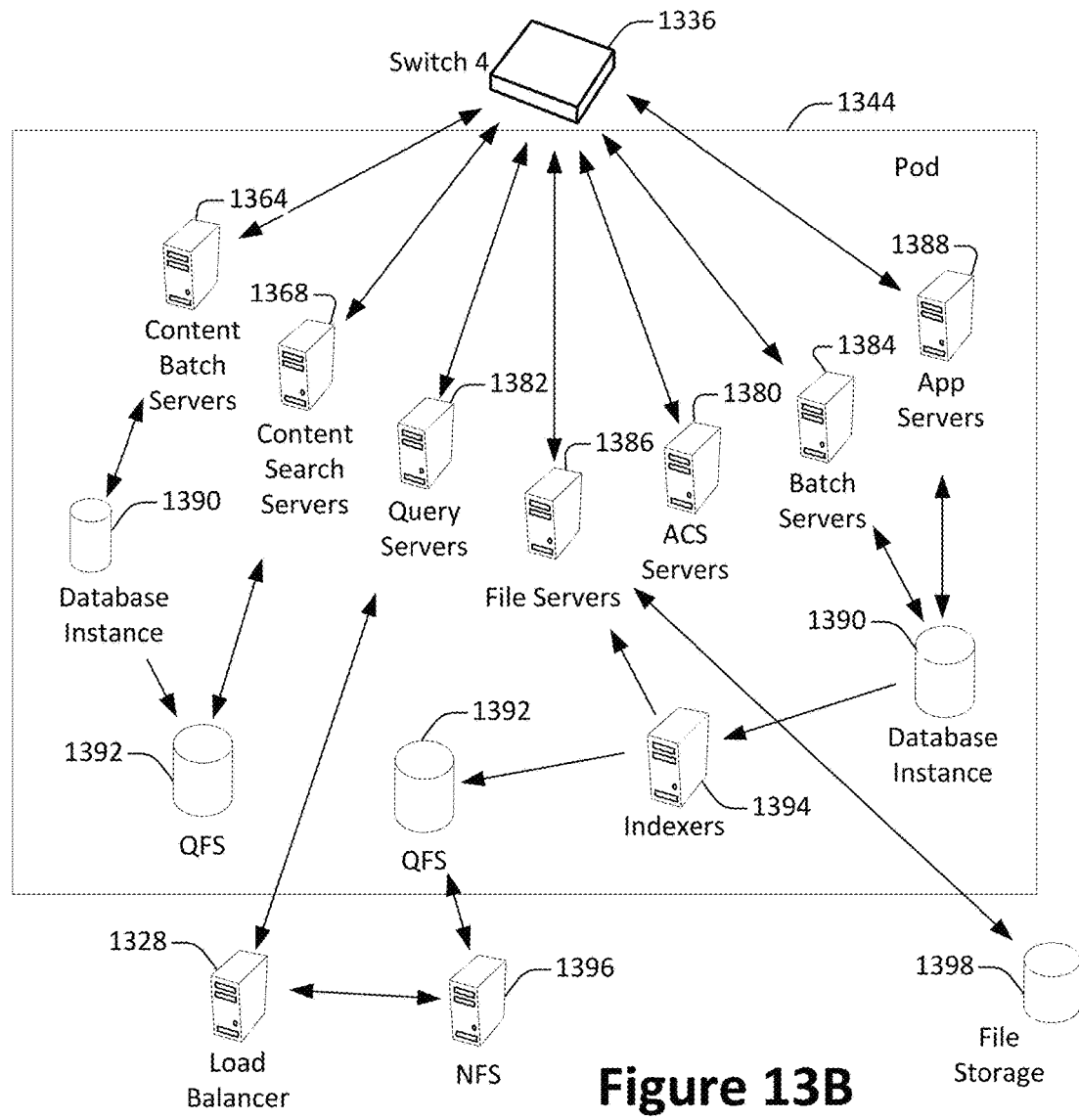
FIG. 13B shows a system diagram further illustrating an example of architectural components of an on-demand database service environment, in accordance with some implementations.

FIG. 13B shows a system diagram further illustrating an example of architectural components of an on-demand database service environment, in accordance with some implementations. The pod 1344 may be used to render services to user(s) of the on-demand database service environment 1300. The pod 1344 may include one or more content batch servers 1364, content search servers 1368, query servers 1382, file servers 1386, access control system (ACS) servers 1380, batch servers 1384, and app servers 1388. Also, the pod 1344 may include database instances 1390, quick file systems (QFS) 1392, and indexers 1394. Some or all communication between the servers in the pod 1344 may be transmitted via the switch 1336.

In some implementations, the app servers 1388 may include a framework dedicated to the execution of procedures (e.g., programs, routines, scripts) for supporting the construction of applications provided by the on-demand database service environment 1300 via the pod 1344. One or more instances of the app server 1388 may be configured to execute all or a portion of the operations of the services described herein.

In some implementations, as discussed above, the pod 1344 may include one or more database instances 1390. A database instance 1390 may be configured as an MTS in which different organizations share access to the same database, using the techniques described above. Database information may be transmitted to the indexer 1394, which may provide an index of information available in the database 1390 to file servers 1386. The QFS 1392 or other suitable filesystem may serve as a rapid-access file system for storing and accessing information available within the pod 1344. The QFS 1392 may support volume management capabilities, allowing many disks to be grouped together into a file system. The QFS 1392 may communicate with the database instances 1390, content search servers 1368 and/or indexers 1394 to identify, retrieve, move, and/or update data stored in the network file systems (NFS) 1396 and/or other storage systems.

In some implementations, one or more query servers 1382 may communicate with the NFS 1396 to retrieve and/or update information stored outside of the pod 1344. The NFS 1396 may allow servers located in the pod 1344 to access information over a network in a manner similar to how local storage is accessed. Queries from the query servers 1322 may be transmitted to the NFS 1396 via the load balancer 1328, which may distribute resource requests over various resources available in the on-demand database service environment 1300. The NFS 1396 may also communicate with the QFS 1392 to update the information stored on the NFS 1396 and/or to provide information to the QFS 1392 for use by servers located within the pod 1344.

In some implementations, the content batch servers 1364 may handle requests internal to the pod 1344. These requests may be long-running and/or not tied to a particular customer, such as requests related to log mining, cleanup work, and maintenance tasks. The content search servers 1368 may provide query and indexer functions such as functions allowing users to search through content stored in the on-demand database service environment 1300. The file servers 1386 may manage requests for information stored in the file storage 1398, which may store information such as documents, images, basic large objects (BLOBs), etc. The query servers 1382 may be used to retrieve information from one or more file systems. For example, the query system 1382 may receive requests for information from the app servers 1388 and then transmit information queries to the NFS 1396 located outside the pod 1344. The ACS servers 1380 may control access to data, hardware resources, or software resources called upon to render services provided by the pod 1344. The batch servers 1384 may process batch jobs, which are used to run tasks at specified times. Thus, the batch servers 1384 may transmit instructions to other servers, such as the app servers 1388, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 14:
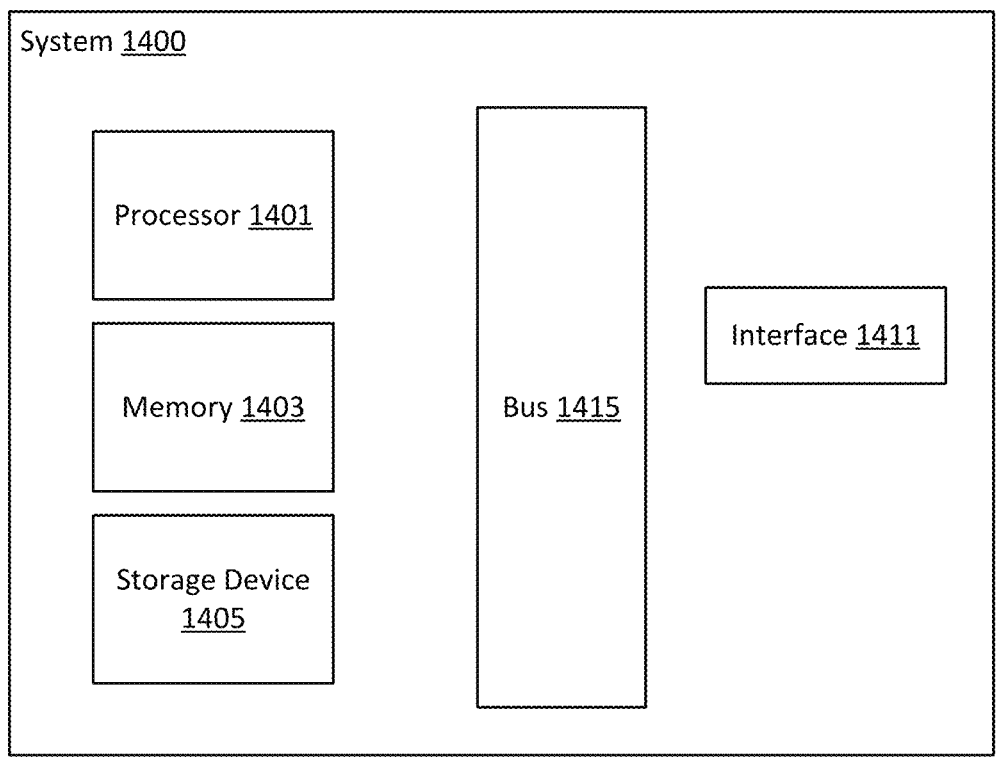
FIG. 14 illustrates one example of a computing device.

FIG. 14 illustrates one example of a computing device. According to various implementations, a system 1400 suitable for implementing implementations described herein includes a processor 1401, a memory module 1403, a storage device 1405, an interface 1411, and a bus 1415 (e.g., a PCI bus or other interconnection fabric.) System 1400 may operate as variety of devices such as an application server, a database server, or any other device or service described herein. Although a particular configuration is described, a variety of alternative configurations are possible. The processor 1401 may perform operations such as those described herein. Instructions for performing such operations may be embodied in the memory 1403, on one or more non-transitory computer readable media, or on some other storage device. Various specially configured devices can also be used in place of or in addition to the processor 1401. The interface 1411 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some implementations include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific implementations including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular implementations may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

What is claimed is:

1. An electronic device comprising one or more processors configured to:
   identify at least one native component and a plurality of web components that includes a first web component and a second web component, wherein the at least one native component and the plurality of web components are configured to be displayed on a user interface screen, and wherein position information identifying a position and boundary of each component included in the user interface screen is stored in a first mapping;
   generate an image of the first web component and an image of the second web component, wherein the images are generated from a screen shot of the user interface screen by masking or cropping based on the first mapping; and
   display the at least one native component at a location on the user interface screen that is between the image of the first web component and the image of the second web component such that the image of the first web component and the image of the second web component are separated, at least in part, by the at least one native component, and are arranged in the user interface of the application based on a second mapping which is generated based on one or more received inputs that indicate changed position information for the images of the first and second web components as well as the at least one native component.

2. The electronic device of claim 1, wherein the one or more processors are further configured to:
   detect a touch input on the image of the first web component; and
   replace the image with the first web component.

3. The electronic device of claim 2, wherein the one or more processors are further configured to:
   generate a mask to mask a display of the first web component.

4. The electronic device of claim 3, wherein the position information further identifies a size of each of the at least one native component and the plurality of web components.

5. The electronic device of claim 3, wherein the second mapping is generated based, at least in part, on the touch input.

6. The electronic device of claim 1, wherein the first web component and the second web component are included in a WebView browser.

7. The electronic device of claim 1, wherein the image of the first web component and the image of the second web component are generated from screen shots of a mobile device.

8. The electronic device of claim 1, wherein the first web component and the second web component are configured to display web content retrieved from an on-demand database service provider.

9. The electronic device of claim 8, wherein the web content comprises one or more data values retrieved from a user profile maintained by the on-demand database service provider.

10. A method comprising:
    identifying at least one native component and a plurality of web components that includes a first web component and a second web component, wherein the at least one native component and the plurality of web components are configured to be displayed on a user interface screen, and wherein position information identifying a position and boundary of each component included in the user interface screen is stored in a first mapping;
    generating an image of the first web component and an image of the second web component, wherein the images are generated from a screen shot of the user interface screen by masking or cropping based on the first mapping; and
    displaying the at least one native component at a location on the user interface screen that is between the image of the first web component and the image of the second web component such that the image of the first web component and the image of the second web component are separated, at least in part, by the at least one native component, and are arranged in the user interface of the application based on a second mapping which is generated based on one or more received inputs that indicate changed position information for the images of the first and second web components as well as the at least one native component.

11. The method of claim 10 further comprising:
    detecting a touch input on the image of the first web component; and
    replacing the image with the first web component.

12. The method of claim 11 further comprising:
    generating a mask to mask a display of the first web component.

13. The method of claim 12, wherein the position information further identifies a size of each of the at least one native component and the plurality of web components.

14. The method of claim 12, wherein the second mapping is generated based, at least in part, on the touch input.

15. The method of claim 10, wherein the first web component and the second web component are included in a WebView browser.

16. The method of claim 10, wherein the image of the first web component and the image of the second web component are generated from screen shots of a mobile device.

17. The method of claim 10, wherein the first web component and the second web component are configured to display web content retrieved from an on-demand database service provider.

18. A computer program product comprising non-transitory computer-readable program code capable of being executed by one or more processors when retrieved from a non-transitory computer-readable medium, the program code comprising instructions configurable to cause the one or more processors to perform a method comprising:
    identifying at least one native component and a plurality of web components that includes a first web component and a second web component, wherein the at least one native component and the plurality of web components are configured to be displayed on a user interface screen, and wherein position information identifying a position and boundary of each component included in the user interface screen is stored in a first mapping;
    generating an image of the first web component and an image of the second web component, wherein the images are generated from a screen shot of the user interface screen by masking or cropping based on the first mapping; and
    displaying the at least one native component at a location on the user interface screen that is between the image of the first web component and the image of the second web component such that the image of the first web component and the image of the second web component are separated, at least in part, by the at least one native component, and are arranged in the user interface of the application based on a second mapping which is generated based on one or more received inputs that indicate changed position information for the images of the first and second web components as well as the at least one native component.

19. The computer program product recited in claim 18, wherein the method further comprises:
    detecting a touch input on the image of the first web component; and
    replacing the image with the first web component.

20. The computer program product recited in claim 19, wherein the method further comprises:
    generating a mask to mask a display of the first web component,
    wherein the position information further identifies a size of each of the at least one native component and the plurality of web components, wherein the second, mapping is generated based, at least in part, on the touch input, and wherein the first web component and the second web component are included in a WebView browser.

* * * * *